United States Patent [19]

Flores et al.

[11] Patent Number: 4,698,804
[45] Date of Patent: Oct. 6, 1987

[54] SHARED DATA TRANSMISSION SYSTEM

[75] Inventors: Christopher Flores, Redbank; Bhaskarpillai Gopinath, Berkeley Heights, both of N.J.

[73] Assignee: Telephone and Telegraph Company, AT&T Bell Labs, Murray Hill, N.J.

[21] Appl. No.: 693,512

[22] Filed: Jan. 22, 1985

[51] Int. Cl.⁴ .............................. H04J 3/08; H04J 3/24
[52] U.S. Cl. .................................. 370/86; 340/825.5; 370/82; 370/94
[58] Field of Search .......................... 340/825.5, 825.51; 455/18, 58; 370/55, 85, 86, 88, 89, 94, 82, 83, 79

[56] References Cited

U.S. PATENT DOCUMENTS

| | | | |
|---|---|---|---|
| 4,225,753 | 9/1980 | Chown et al. | 370/86 |
| 4,439,763 | 3/1984 | Limb | 340/825.5 |
| 4,500,987 | 2/1985 | Hasegawa | 370/86 |
| 4,514,841 | 4/1985 | Sandberg | 370/55 |
| 4,519,068 | 5/1985 | Krebs et al. | 370/94 |
| 4,566,097 | 1/1986 | Bederman | 340/825.5 |
| 4,567,590 | 1/1986 | Bederman | 370/86 |
| 4,637,014 | 1/1987 | Bell et al. | 370/89 |

*Primary Examiner*—Benedict V. Safourek
*Attorney, Agent, or Firm*—Robert O. Nimtz

[57] ABSTRACT

A digital transmission system includes a plurality of stations sharing a common transmission line. Variable length messages, set off by flags, are exchanged between pairs of stations. While a message is being received, the downstream portion of the transmission line is segmented to permit simultaneous use by another station pair. If a message is received from an upstream station while a message is being transmitted downstream, an abort message flag terminates the transmitted message abruptly to permit flowthrough of the received message. When any station is not in use or out of order, it is bypassed to permit use of the transmission line by the rest of the stations.

1 Claim, 5 Drawing Figures

SHARED DATA TRANSMISSION SYSTEM

TECHNICAL FIELD

This invention relates to digital transmission systems and, more particularly, to multistation common line transmission systems.

BACKGROUND OF THE INVENTION

In digital transmission systems, and particularly in local area networks (LANs), it is common to connect a plurality of stations together by a common transmission medium. In such systems, each station transmits digital data on the common transmission system, one at a time, and the remaining stations must wait until the medium is idle before starting a transmission. To assist in assigning the common transmission medium to the stations, elaborate protocols are often used, sometimes invoking a master station which enforces access priorities by assigning the transmission facility to the stations in a preselected order. Such elaborate protocols increase the overhead in operating such a system and reduce the data throughput proportionally.

Data transmitted on such local area networks has usually been divided into equal-sized packets. Such packets are usually kept to a reasonable size to give other stations a fair opportunity to seize the common line for transmitting their own message packets. The packet size, however, is arbitrary in terms of the actual needs of the transmitting stations and requires wasteful padding of unused portions of the packet for short messages or dividing large messages arbitrarily into a number of packet-sized pieces. Both message padding and message segmentation reduce the overall throughput of the transmission system.

Finally, since the transmission medium is used in common by a plurality of stations, only two stations can be interconnected at any one time. When in use, all other stations must wait until the transmission path is idle before initiating their own message transmissions.

SUMMARY OF THE INVENTION

These and other problems are solved in accordance with the principles of the present invention by providing a common line transmission system with a plurality of equal and identical stations each having equal ability to contend for the common transmission line. Moreover, data messages can be of any length and are delineated only by start-of-message (SOM) and end-of-message (EOM) flags preceding and following, respectively, the data message. This simplicity of implementation reduces the cost of the stations and increases the efficiency of message delivery. Moreover, the length of a message need not be ascertained prior to the initiation of transmission, thus permitting immediate transmission without buffering, and allowing dynamic software control over length in response to conditions arising *after* transmission is initiated (e.g., priority interrupts).

In order to prevent collisions between messages transmitted from an upstream station and messages already in progress from a downstream station, each station terminates transmission upon detection of the arrival of a message from an upstream station. To signal the receiving station that the message has been aborted, an abort-message (AM) flag is transmitted. Thus, the AM flag implements an extremely simple collision-avoidance scheme.

Finally, in order to maximize the use of the common transmission medium, during the receiving mode, each station segments the transmission medium on its downstream side, thus making the unused portion of the transmission line available for use for transmission between downstream stations. Such segmentation also permits simultaneous reception and transmission from each station since the received message never passes the receiving station.

A final advantage of the present invention is the fact that it is unnecessary to specify the packet size a priori, thus permitting different sizes for different users.

DETAILED DESCRIPTION

Figure 1:
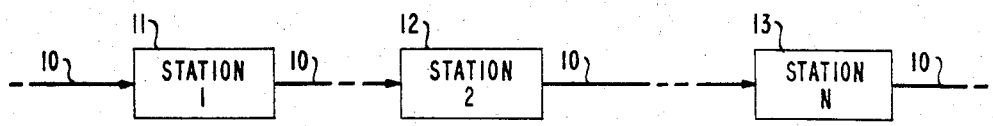
FIG. 1 is a general block diagram of a common channel data transmission system of the type in which the present invention might find use.

Referring more particularly to FIG. 1, there is shown a block diagram of a common line transmission system in which the present invention may find use. The system of FIG. 1 comprises a common transmission medium 10 interconnecting a plurality of identical stations 11, 12, . . . 13. Digital transmission between stations 11–13, in the prior art, takes place over transmission medium 10 on a one-at-a-time basis. That is, when any two stations on transmission line 10 were communicating, none of the other stations on line 10 were able to communicate. In prior art systems, this one-at-a-time capability led to elaborate administrative overhead in an attempt to secure fair sharing of the facility 10.

One solution was to provide a master station which actively assigned the use of the transmission facility 10 to the stations 11, 12 and 13 either on a priority basis or on a round-robin basis. The assignment protocols, however, used up much of the transmission time which was in such scarce supply.

To ensure fair sharing of the transmission medium, active stations were required, in the prior art, to transmit fixed-length packets. If the packets were short, the headers represented a high overhead and long messages required unnecessary subdivisions. If the packets were long, them short messages required wasteful padding. Another approach was to devise procedures to resolve competition among many active stations without a master station. However, many of these contention resolution schemes involved retransmissions that wasted considerable transmission time.

Finally, while any two stations are using the transmission medium 10 for transmitting a message therebetween, a significant portion of the transmission path is idle or unused since such portions lie outside of the direct path between the two active stations.

The present invention eliminates or alleviates all of these problems. In general, this is accomplished by (1) resolving the competition among active stations without a master station and without wasteful retransmission; (2) by permitting each station to transmit variable length packets of a length just sufficient to accommodate the data to be transmitted; and (3) breaking the transmission path on the downstream side of the receiving station to permit simultaneous use of the common path between two downstream stations. In this invention, the transmission of any message is aborted whenever a message packet is received at the upstream side of a transmitting station. Although this arrangement does occasionally break messages up into less than optimal length packets, it does so only to accommodate actual data being transmitted, rather than arbitrarily, as in the prior art.

Figure 2:
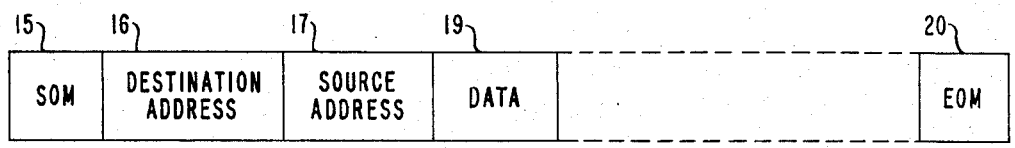
FIG. 2 is a graphical representation of a typical data message transmitted in the transmission system of FIG. 1.

Referring to FIG. 2, there is shown a graphical representation of a typical message packet format which might be used in a system in accordance with the present invention. The format of FIG. 2 starts with a Start-of-Message (SOM) field 15 which contains a uniquely distinguishable bit pattern which is not duplicated anywhere else in the message packet. This can be accomplished, for example, by inserting the complement of the last bit of the SOM flag whenever all bits but the last bit occur by chance in the data stream. The SOM flag 15 is followed by a destination field 16 which identifies, in coded form, the station to which the message packet of FIG. 2 is to be delivered. Following destination field 16 is a source address field 17, identifying the station which originated the message packet of FIG. 2. Destination field 17 is followed by data field 19. Data field 19 can be of any length and is terminated by an End-of-Message (EOM) flag 20. Like SOM flag 15, EOM flag 20 is a uniquely distinguishable bit pattern which is not duplicated anywhere else in the message format. The data field 19 may include internal control data such as error control, but the system of the present invention treats the entire field 19 as data and merely passes it on to the receiver.

Figure 3:
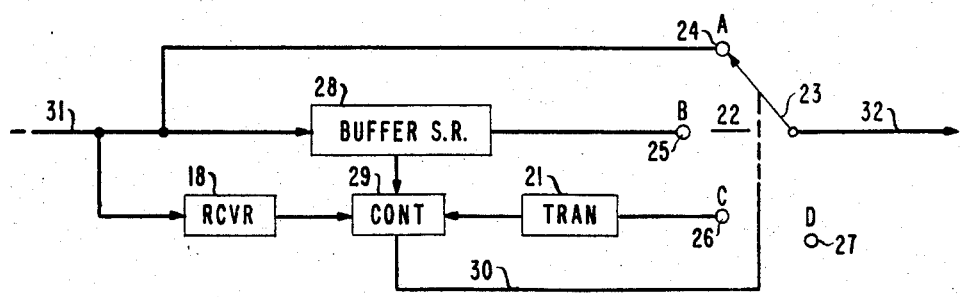
FIG. 3 is a functional block diagram of one station of the transmission system of FIG. 1 arranged in accordance with the present invention.

In accordance with the illustrative embodiment of the present invention, each of stations 11-13 of FIG. 1 is constructed in accordance with the block diagram of FIG. 3. The station of FIG. 3 comprises a standard data receiver 18 and a standard data transmitter 21. Also included is a multiposition switch 22 having a rotating contact 23 and a plurality of fixed contacts 24, 25, 26 and 27. While switch 22 is shown in FIG. 3 as a mechanical switch for illustrative purposes, it is actually implemented as a high-speed electronic switch.

The station of FIG. 3 also includes a buffer shift register 28 and a control circuit 29 which controls the position of switch 22 via line 30. The station of FIG. 3 is connected between an upstream leg 31 of common transmission line 10 (FIG. 1) and a downstream leg 32 of common transmission line 10. The digital data station of FIG. 3 operates as follows:

When the station of FIG. 3 is idle and not in use, switch 22 is in position A (fixed contact 24) as shown in FIG. 3. In this position, the station of FIG. 3 is entirely bypassed and the balance of the system operates as if the station of FIG. 3 did not exist. This bypass condition permits repairs on the station of FIG. 3 without interrupting the operation of the balance of the system.

When the station of FIG. 3 is active but is not currently receiving data, the switch 22 is in position B (fixed contact 25). In this position, data appearing on input leg 31 is passed through shift register 28 and then out through switch 22 to output leg 32. Shift register 28 is long enough to accommodate SOM field 15, destination address field 16, and an "Abort Message" (AM) flag (to be discussed below).

If the destination address field 16 matches the address of the station of FIG. 3, the message is delivered to receiver 20. At the same time, switch 22 is placed in position D (fixed contact 27), thereby disconnecting the downstream leg 32 from the station of FIG. 3 and from the upstream leg 31. When switch 22 is in position D, two downstream stations can exchange messages without interference from the message between the station of FIG. 3 and its upstream transmitting station. This sharing of the common transmission medium 10 between two sets of non-overlapping stations increases the message capacity of the system by a significant amount. At the end of the message (EOM flag received), switch 22 is returned to position B (fixed contact 25) to permit through transmission of messages intended for downstream stations and to await new messages intended for the station of FIG. 3.

When the station of FIG. 3 wishes to transmit a message, it waits until any messages in progress terminate and then switch 22 is placed in position C (fixed contact 26). In this position, transmitter 21 can transmit a message to a downstream station via switch 22 and downstream leg 32. At the end of the transmission, the switch is returned to position B.

If a message is received on the upstream leg 31 while the station of FIG. 3 is in the process of transmitting a message and the message is destined for that station, the switch 22 stays in position C. If the EOM for the transmitted message occurs before the EOM for the received message, the switch 22 moves to position D. In this way, the present invention provides the unique capability for the station to transmit and receive messages simultaneously.

If a message is received on upstream leg 31 while the station of FIG. 3 is in the process of transmitting a message, and the message is not destined for the station of FIG. 3, an Abort-Message (AM) flag is transmitted on downstream leg 32 and switch 22 is placed in position B (fixed contact 25). This allows the incoming message to flow past the station of FIG. 3 with only the delay caused by shift register 28. Shift register 28 is just long enough to permit the detection of the SOM flag and destination address field of the incoming message and to permit the insertion of the AM flag to terminate the transmitted message. This requires, of course, that the downstream receiving station for the message originating in FIG. 3 must wait for the balance of the message. Having been warned by the AM flag that the message was aborted, however, permits the receiving station to accommodate this interruption. Moreover, such occasional interruptions of messages is far superior to retransmissions (necessitated by collisions) that use up transmission time, and is superior to expensive master stations which prevent collisions in the first place.

Figure 4:
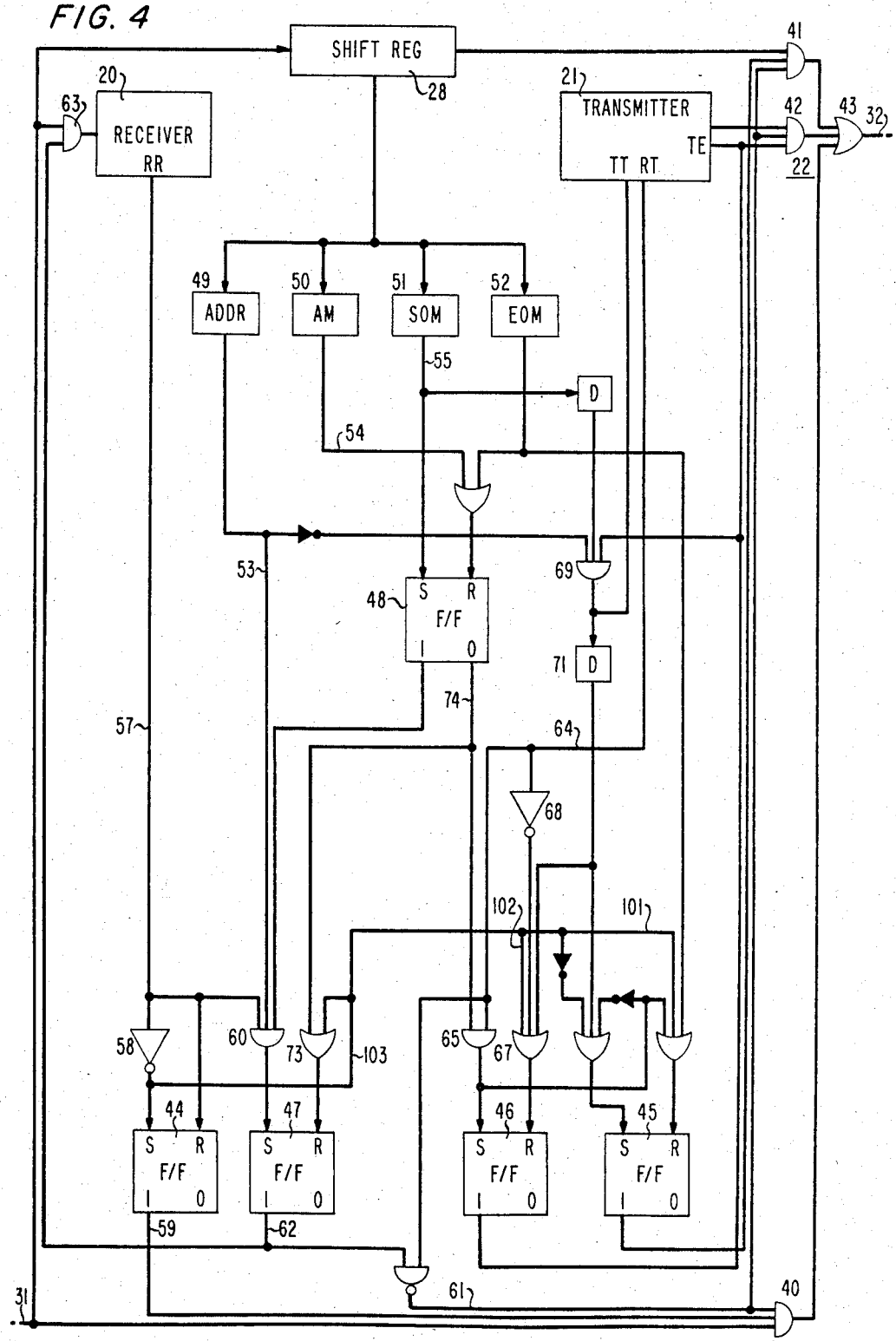
FIG. 4 is a detailed circuit diagram of the station shown in FIG. 3.

In FIG. 4 there is shown a digital circuit diagram of the station arrangement shown in block form in FIG. 3. The same reference numerals have been used in FIG. 4 to refer to elements also found in FIG. 3. The station of FIG. 4 comprises a standard data receiver 18 and a standard data transmitter 21. Receiver 18 and transmitter 21 may, of course, be part of a host computer which forms the bulk of the station, or they may merely be modems attached to computers or terminals or any other source of data. The multiposition switch 22 is realized as a bank of logical AND gates 40, 41 and 42, corresponding, respectively, to switch positions A, B and C. A logical OR gate 43 collects the outputs of AND gates 40-42 and connects them to downstream leg 32.

Each of AND gates 40, 41 and 42 is controlled by an associated flip-flop: A flip-flop 44 controls AND gate 40, B flip-flop 45 controls AND gate 41, and C flip-flop 46 controls AND gate 42. The fourth D position of switch 22 is controlled by D flip-flop 47 which produces an output which disables the three AND gates 40, 41 and 42 when the switch 22 is in position D. A fifth flip-flop, M flip-flop 48, is set when a received message begins and is reset when a received message ends. Thus Message (M) flip-flop 48 is set for the duration of all received messages and reset at the end.

In order to control flip-flops 44-48, a bank of detectors 49, 50, 51 and 52 is provided, all of which are connected to the bit positions of the first field of shift register 28. Detector 49 detects the address of the station depicted in FIG. 4 and produces an output on lead 53 when this address is detected. Detector 50 detects the Abort Message (AM) flag and produces an output on lead 54 when the AM flag is received in shift register 28. Detector 51 detects the Start-of-Message (SOM) flag and produces an output on lead 55 when the SOM flag is received in shift register 28. Detector 52 detects the End-of-Message (EOM) flag and produces an output on lead 56 when the EOM flag is received in shift register 28. M flip-flop 48 is set by the SOM flag signal on lead 55 and reset by the EOM flag on lead 56.

Receiver 18 produces a Ready-to-Receive (RR) signal on lead 57 when receiver 20 is ready to receive messages. If the receiver 20 is powered down or if the station of FIG. 4 is withdrawn from service, the RR signal will not be present on lead 57. When the RR signal is absent, this absence is inverted in inverter circuit 58 to set A flip-flop 44, reset B flip-flop 45, reset C flip-flop 46 and reset D flip-flop 47. When set, A flip-flop 44 produces an output on lead 59 to enable A AND gate 40. When reset, B flip-flop 45 disables AND gate 41 and, when reset, C flip-flop 46 disables AND gate 42, thus permitting the station to be bypassed. When an RR signal appears on line 57, A flip-flop 44 is reset and B flip-flop 45 is set to remove the bypass enable signal on lead 59 and enable the AND gate 41.

If the M flip-flop 48 is set, indicating that an SOM flag has been received, and if detector 49 detects the presence of the address of this station, and finally, if receiver 20 is ready to receive, AND gate 60 is fully enabled and D flip-flop 47 is set. This removes the signal on lead 61 which, together with the fact that the transmitter is not transmitting and the Ready-to-Transmit (RT) signal is off, was enabling AND gates 40, 41 and 42, thus effectively disconnecting downstream leg 32 from the station of FIG. 4. At the same time, a signal appears on output lead 62 from D flip-flop 47 to enable AND gate 63. AND gate 63 permits the incoming message to be routed to receiver 20. Receiver 20 receives and processes the incoming message until it is terminated by either an End-of-Message (EOM) signal, or by an Abort Message (AM) signal. If an AM signal is received, receiver 20 merely waits for a future message transmission to get the balance of the message.

If, while the station of FIG. 4 is receiving a message, the AM flag is received, OR gate 73 is enabled to reset D flip-flop 47 and enable gates 40, 41 and 42. The receiver 20 must then wait for a future transmission to complete the message. D flip-flop 47 is also reset by the receipt of an EOM flag which resets M flip-flop 48 and enables OR gate 73 via lead 74.

If the station of FIG. 4 wishes to transmit a message, the transmitter 21 issues a Ready-to-Transmit (RT) signal on lead 64 which partially enables AND gate 65. AND gate 65 is fully enabled by "0" output from M flip-flop 48, indicating that a message is not in progress. If a message is in progress, transmitter 21 must wait until that message-in-progress is completed. When the EOM flag or AM flag is received, M flip-flop 48 is reset and AND gate 65 is fully enabled to set C flip-flops 45 and 46. The output from C flip-flop 46 enables C AND gate 42 and provides a Transmit-Enable (TE) signal to transmitter 21 on lead 66. The output from B flip-flop 45 disables AND gate 41. Transmitter 21 then proceeds to transmit its message (once the EOM or AM flag passes through shift register 28) formatted as shown in FIG. 2. When the message is fully transmitted, the signal is removed from RT lead 64 and C flip-flop 46 is reset via OR gate 67 and inverter 68. B flip-flop 44 is set, thus moving switch 22 from C to B. If a message arrives from upstream leg 31 while transmitter 21 is in the process of sending a message, and an address match is found, then the D flip-flop 47 is set, enabling the receiver 20. Since the RT signal on lead 64 is active, all of the AND gates 40, 41 and 42 are not disabled. This allows the station to receive and transmit messages simultaneously. If the EOM of the transmitted message occurs before the EOM of the received message, the RT signal goes off and AND gates 40, 41 and 42 are disabled, effectively moving switch 22 to position D. If the EOM or AM of the received message occurs before the EOM of the transmitted message, then the receiver 20 is disabled and the switch 22 effectively remains in position C.

If a message not intended for the station of FIG. 4 arrives from upstream leg 31 while transmitter 21 is in the process of sending a message, the SOM flag detected by detector 51 places a signal on lead 55 which is applied to AND gate 69. AND gate 69 is fully enabled by the output of C flip-flop 46 and produces a signal through delay circuit 71 to OR gate 67 and resets C flip-flop 46. At the same time, a Terminate-Transmission (TT) signal is applied directly from gate 69 via lead 70 to transmitter 21. In response to the TT signal on lead 70, transmitter 21 transmits an AM flag and discontinues transmission. The output of delay circuit 71 not only resets flip-flop 46, but also sets B flip-flop 45, thus enabling AND gate 41. The delay 71 delays this action sufficiently to permit the head of the newly arriving message to propagate through shift register 28 while transmitter 21 is transmitting the AM flag.

The specific logic to control the station of FIG. 4 is shown in only one form for the purposes of simplicity. Many other logic circuit forms could provide the same functions. Indeed, a general purpose computer could be programmed to provide these functions in response to signals from detectors 49-52.

It is to be noted that the present invention can be used to implement variable-length messages in a transmission system. Indeed, message length can vary between sets of users or between the same users at different times. Moreover, fixed length message formats can also be implemented in accordance with the present invention, using the SOM, AM and EOM flags to accommodate fixed length terminals. In the latter case, however, changes in fixed length formats are automatically accommodated should hardware changes or system design changes call for message length changes.

Figure 5:
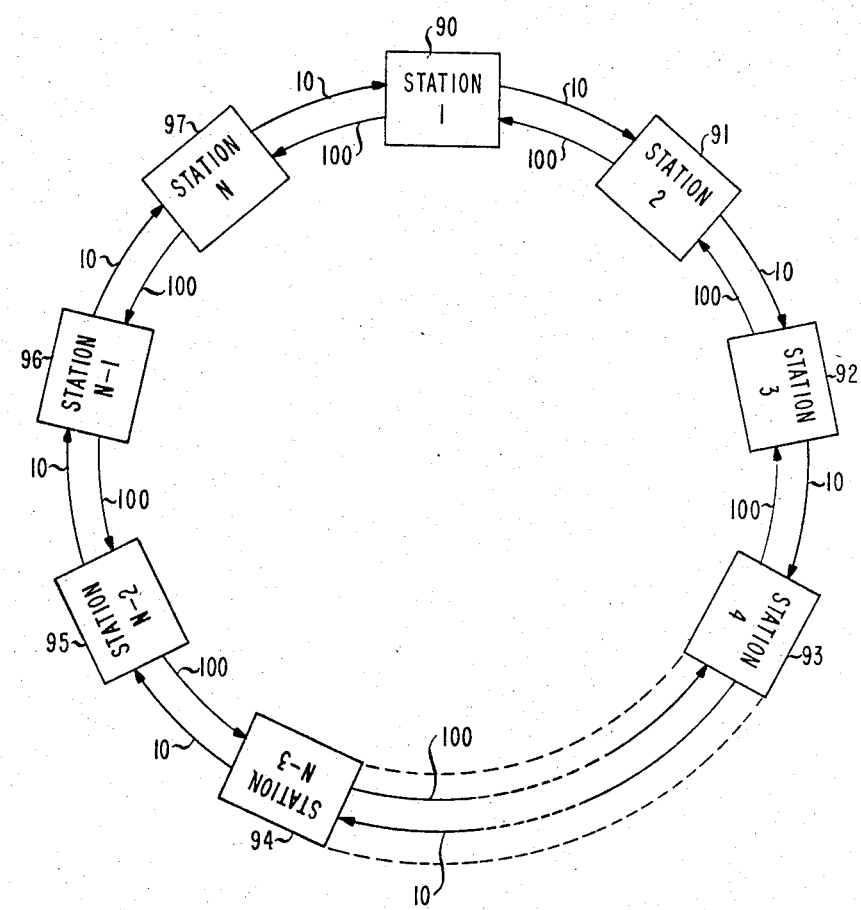
FIG. 5 is bidirectional loop transmission system in which the stations of FIGS. 3 and 4 can advantageously be used.

In FIG. 5 there is shown one application of the transmission technique of the present invention. In FIG. 5, a plurality of stations 90–97 are connected by a common transmission line 10 into a closed loop. This closed loop architecture allows each of stations 90–97 to communicate with any other station on the unidirectional transmission line 10. In order to reduce the incidence of aborted messages on transmission line 10, a second transmission line 100 may be used to interconnect the same stations 90–97. If, as illustrated, transmission line 100 carries traffic in the opposite direction, it is possible for each of stations 90–97 to choose between transmission lines 10 or 100 for transmission. If the route is shorter in one direction, that transmission line can be chosen to maximize the probability of the use of the link remaining between the remaining stations. On the other hand, if one of the transmission lines is busy, the other can be chosen for transmission, thus reducing the delay before transmission. Indeed, this idea can be extended to three or more transmission lines connecting the stations 90–97 with the ability to choose any idle line for transmission.

The transmission lines 10 or 100 can be any transmission media whatsoever, from telephone lines, coaxial cable, and microwave radio to optical fibers. The broader the bandwidth, of course, the faster the messages will be delivered and the less chance there will be of message collision.

What is claimed is:

1. A common line transmission system comprising
a plurality of stations connected by a common transmission medium,
means at each of said stations for launching messages on said medium, each said message including a header identifying the source and destination of said message,
means at each of said stations for disconnecting a transmitting side of said station from said medium during message reception,
means at each of said stations for aborting a partial message in the process of being transmitted in response to the reception of another message at said station, and
means for transmitting, at a later time, the aborted portion only of said partial message together with a header identifying the source and destination of said aborted portion.

* * * * *